(12) United States Patent
Goldberg et al.

(10) Patent No.: US 10,933,530 B2
(45) Date of Patent: Mar. 2, 2021

(54) METHOD AND SYSTEM FOR PRESERVING PRIVACY FOR CLOUD-BASED MANUFACTURING ANALYSIS SERVICES

(71) Applicants: Siemens Aktiengesellschaft, Munich (DE); THE REGENTS OF THE UNIVERSITY OF CALIFORNIA, Berkeley, CA (US)

(72) Inventors: Kenneth Yigael Goldberg, Mill Valley, CA (US); Ramu Chandra, Union City, CA (US); Florian Till Pokorny, Täby (SE); Jeffrey Brian Mahler, Berkeley, CA (US); Juan L. Aparicio Ojea, Berkeley, CA (US)

(73) Assignees: Siemens Aktiengesellschaft, Munich (DE); THE REGENTS OF THE UNIVERSITY OF CALIFORNIA, Berkeley, CA (US)

( * ) Notice: Subject to any disclaimer, the term of this patent is extended or adjusted under 35 U.S.C. 154(b) by 80 days.

(21) Appl. No.: 16/325,414

(22) PCT Filed: Aug. 16, 2017

(86) PCT No.: PCT/US2017/047131
§ 371 (c)(1),
(2) Date: Feb. 14, 2019

(87) PCT Pub. No.: WO2018/035216
PCT Pub. Date: Feb. 22, 2018

(65) Prior Publication Data
US 2019/0210223 A1 Jul. 11, 2019

Related U.S. Application Data

(60) Provisional application No. 62/375,952, filed on Aug. 17, 2016.

(51) Int. Cl.
*B25J 9/16* (2006.01)
*G06T 17/10* (2006.01)
*G06T 17/20* (2006.01)

(52) U.S. Cl.
CPC .......... *B25J 9/1669* (2013.01); *B25J 9/1602* (2013.01); *G06T 17/10* (2013.01); *G06T 17/20* (2013.01);
(Continued)

(58) Field of Classification Search
CPC .............. G06F 21/6236; G06F 21/6218; B25J 9/1633; B25J 9/1674; B25J 9/1602;
(Continued)

(56) References Cited

U.S. PATENT DOCUMENTS 5,826,265 A * 10/1998 Van Huben ......... G06F 16/2308
6,278,457 B1    8/2001 Bernardini et al.
(Continued)

OTHER PUBLICATIONS

International Search Report dated Dec. 1, 2017; PCT/US2017/047131; International Filing Date: Aug. 16. 2016; 16 pages.
(Continued)

*Primary Examiner* — Kidest Bahta

(57) ABSTRACT

A system for analyzing geometric properties for an object includes designing the object in a first computer process and producing information relating to the geometric properties of the object, and receiving the information in a second computer processor which identifies a first portion of the geometric property information as masked or private and second portion identified as public or shared, analysis is performed by the second processor on the public/shared portion of the geometric property information. An output based on the analysis may be provided to an industrial system performing processes on the object. A binary privacy label may be assigned to each triangle in a set of triangles representing the surfaces of the object in a 3D object mesh.

(Continued)

The privacy label denotes an associated triangle as being private or shared. The system may be used to produce a set of planned grasps for a robotic gripper.

16 Claims, 8 Drawing Sheets

(52) U.S. Cl.
CPC ............... *G05B 2219/39543* (2013.01); *G05B 2219/40113* (2013.01)

(58) Field of Classification Search
CPC ......... B25J 9/1669; G05B 2219/41114; G05B 2219/39542; G05B 2219/39543; G05B 2219/40113; G06T 17/10; G06T 17/20
See application file for complete search history.

(56) References Cited

U.S. PATENT DOCUMENTS

| | | | | |
|---|---|---|---|---|
| 6,801,821 | B2* | 10/2004 | Madden | B62D 65/02 700/101 |
| 7,196,702 | B1* | 3/2007 | Lee | G06T 17/30 345/419 |
| 9,321,179 | B2* | 4/2016 | Inoue | B25J 17/02 |
| 2008/0084414 | A1* | 4/2008 | Rosel | G06T 17/20 345/423 |
| 2014/0188437 | A1* | 7/2014 | Red | G06F 30/23 703/1 |
| 2016/0023351 | A1 | 1/2016 | Kuffner et al. | |
| 2016/0379002 | A1* | 12/2016 | Drabant | G06F 21/6236 726/17 |
| 2017/0061037 | A1* | 3/2017 | Makem | G06F 30/23 |

OTHER PUBLICATIONS

Ben Kehoe et al: "Estimating part tolerance bounds based on adaptive Cloud-based grasp planning with slip", Automation Science and Engineering (CASE), 2012 IEEE International Conference on, IEEE, US, Aug. 20, 2012 (Aug. 20, 2012), pp. 1106-1113, XP032289981 / Aug. 20, 2012.

* cited by examiner

METHOD AND SYSTEM FOR PRESERVING PRIVACY FOR CLOUD-BASED MANUFACTURING ANALYSIS SERVICES

This application is a national phase filing under 35 U.S.C. § 371 of International Patent Application No. PCT/US2017/047131, filed Aug. 16, 2017, which claims the benefit of priority to U.S. Provisional Patent Application Ser. No. 62/375,952, filed Aug. 17, 2016, which are incorporated herein by reference in their entirety.

STATEMENT OF GOVERNMENTAL INTEREST

This invention was made with government support under the NSF-Graduate Research fellowship awarded by the National Science Foundation, and under the National Defense Science & Engineering Graduate Fellowship (NDSEG) awarded by the Department of Defense. The government has certain rights in the invention.

TECHNICAL FIELD

This application relates to manufacturing and robotics. More particularly, aspects of the application relates to preserving privacy for users of cloud-based manufacturing analysis and robot grasp planning services.

BACKGROUND

In industrial applications such as manufacturing operations, computerized robots are frequently used to manipulate objects. When an object being manufactured is newly designed, or an existing object is redesigned, the manufacturing process needs to be reconfigured. For example, an assembly line for manufacturing a given object may require repositioning of components of the assembly line. Further, robotic devices interacting with the assembly line may need to be repositioned or re-programmed to interact properly with the updated manufacturing process. Information relating to automated manufacturing processes, including parameters for programming robotic devices may be managed and processed by computer resources connected via a computer network. The computer resources may be interconnected in a cloud-based computing environment. Cloud-based robotics and automation systems utilize remote computation and memory, planning actions based on shared libraries of product data, prior sensor readings, and maps. Recent research suggests that system providing Grasp Planning as a Service (GPaaS), from applications such as GRASPIT! and DEX-NET 1.0 may reduce the time required to plan a diverse set of robust grasps to cover a new object by leveraging grasps computed for three-dimensional (3D) object models. This motivates the development of cloud-based shared and growing datasets where users may upload new part geometry to a GPaaS and receive a ranked set of robust grasp configurations. A cloud-based GPaaS also eliminates the need for platform specific software updates and maintenance.

One challenge that exists for cloud-based planners is that individual users may be reluctant or prohibited from sending proprietary 3D geometric data such as connectors between parts, the dimensions of a part (e.g., diameter of a turbine shaft), or gear ratios and pitches. Improved methods and systems that allow for cloud-based collaboration while preserving privacy relating to the objects presented to cloud-based services is desired.

SUMMARY

A system for analyzing geometric properties of an object includes a first computer processor configured to design the object and produce information relating to the geometric properties of the object, and a second computer processor in communication with the first computer processor, the second processor configured to receive the information relating to the geometric properties of the object. A first portion of the information relating to the geometric properties represents a private/masked portion of the object that conceals at least one aspect of the geometric properties of the object, and a second portion of the information relating to the geometric properties of the object represents a sharable unmasked portion of the object. The second processor is configured to analyze the unmasked portion of the object and provide output information of the analysis to an industrial system.

The system may further include a privacy labelling tool. The privacy labelling tool may be configured to run on the first processor and display a mesh representation of the object, the mesh comprising a plurality of vertices and a plurality of triangles defined by the connection of three of the vertices. The privacy labelling tool may also receive one or more commands from a user defining bounding boxes that contain at least one of the triangles of the mesh that are identified as masked portions of the object. Once identified as masked or unmasked the privacy labelling tool labels each triangle $t_i$ of the mesh with a binary privacy label, wherein a binary privacy label $Z(t_i)=1$ indicates the triangle is a private/masked geometric property of the object and a privacy label $Z(t_i)=0$ indicates the triangle is a sharable/unmasked geometric property of the object.

In some embodiments, a privacy masking tool configured to run on the first processor, the privacy masking tool configured to apply a masking function, the masking function configured to the triangles marked as private based on the binary privacy label of each triangle in the mesh, wherein a triangle having a binary privacy value of 1 is private and a triangle having a binary privacy value of 0 is sharable.

According to an embodiment, the first processor computes all stable poses of the object. The system may include a masking function configured to create a bounding box around regions of the mesh that contain triangles associated with masked portions of the object mesh. In other embodiments, the masking function is configured to replace connected components associated with masked portions of the object mesh with a convex hull of each connected component.

Embodiments described herein may include a candidate grasp generation tool configured to run on the second processor, the candidate grasp generation tool configured to identify a set of candidate grasps, each grasp based on two contact points on a surface of the object mesh, wherein each of the two contact points are associated with a center of a corresponding triangle in the unmasked portion of the object mesh. According to some embodiments, the candidate grasp generation tool may rank the candidate grasps in order of robustness to perturbations. In some embodiments, the candidate grasp generation tool is further configured to subdivide the at least one triangle in the unmasked portion of the object mesh by primal triangular quadrisection.

The candidate grasp generation tool may be further configured to determine for candidate grasps for each stable pose of the object, whether operation of the robotic gripper associated with each candidate grasp results in a collision of the gripper with a portion of the object. If there is no collision for a particular candidate grasp, the candidate grasp generation tool calculates a robustness measure of the candidate grasp indicative of a likelihood that operation of the gripper to contact the object at the associated contact points for the associated stable pose of the object will result in successful grasp of the object. The robustness measure is based on a probability of force closure under object pose, robotic gripper pose, and friction uncertainty. In some embodiments, the robustness measure is based on a Ferrari-Canny metric.

According to some aspects of embodiments of this disclosure, the geometric properties of the object comprise a three-dimensional mesh generated by a computer aided design (CAD) tool. In embodiments of this disclosure, the second processor is associated with a grasp planning as a service (GPaaS) online application.

According to aspects of a method of analyzing geometric properties of an object the method includes: in a computer processor, receiving design information relating to a first portion of the received designed information as a private/masked portion of the object and to a second portion of the received design information as a shared/unmasked portion of the object, wherein the private/masked portion of the object conceals at least one aspect of the geometric properties of the object; analyzing the first and second portions of the design information relating to the geometric properties of the object; and producing an output representative of a property corresponding to the geometric properties of the object, based on the unmasked portion of the object; and providing the output representative of the property to an industrial system.

Methods according to some embodiments described in this disclosure further include in the computer processor, representing the geometric properties of the object as a three-dimensional mesh comprising a plurality of vertices and a plurality of triangles representative of surfaces of the object, each triangle defined by three of the plurality of vertices.

In some embodiments of methods of this disclosure, the methods further include in the computer processor, determining a set of stable poses for the mesh relative an infinite planar work surface.

According to aspects of other embodiments, the method further comprises in the computer processor, receiving a command from a user, the command operative to identify at least one proprietary zone comprising at least one triangle of the object mesh; and creating a binary privacy label for each triangle in the object mesh, wherein the binary privacy label has a first value representative of a private/masked triangle and a second value representative of a sharable/unmasked triangle.

In another embodiment, the method includes, in a second computer processor, identifying a set of grasps based on three-dimensional mesh for a robotic gripper and sharable/unmasked triangles of the object mesh. In other embodiments the second computer processor, may assign a quality metric to each grasp in the set of grasps; and output a set of planned grasps, wherein each planned grasp has a quality metric that exceeds a predetermined threshold.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

A privacy preserving approach to grasp planning where only a subset of the part boundary is exposed to the Cloud will now be described. A grasp coverage metric is defined based on dispersion, a metric of sample coverage used in motion planning, and part privacy is defined based on a percentage of the mesh surface that is masked. An algorithm is developed for planning a covering set of robust and collision-free grasps on a masked part given a set of stable poses for the part on a planar work surface and the geometry of a parallel jaw gripper. The tradeoff between privacy and coverage will be explored. One approach may be implemented based on DEX-NET 1.0 using tools for labelling proprietary zones of parts and analyzing object stable poses and inertial properties before transmitting the data to a GPaaS.

Figure 1:
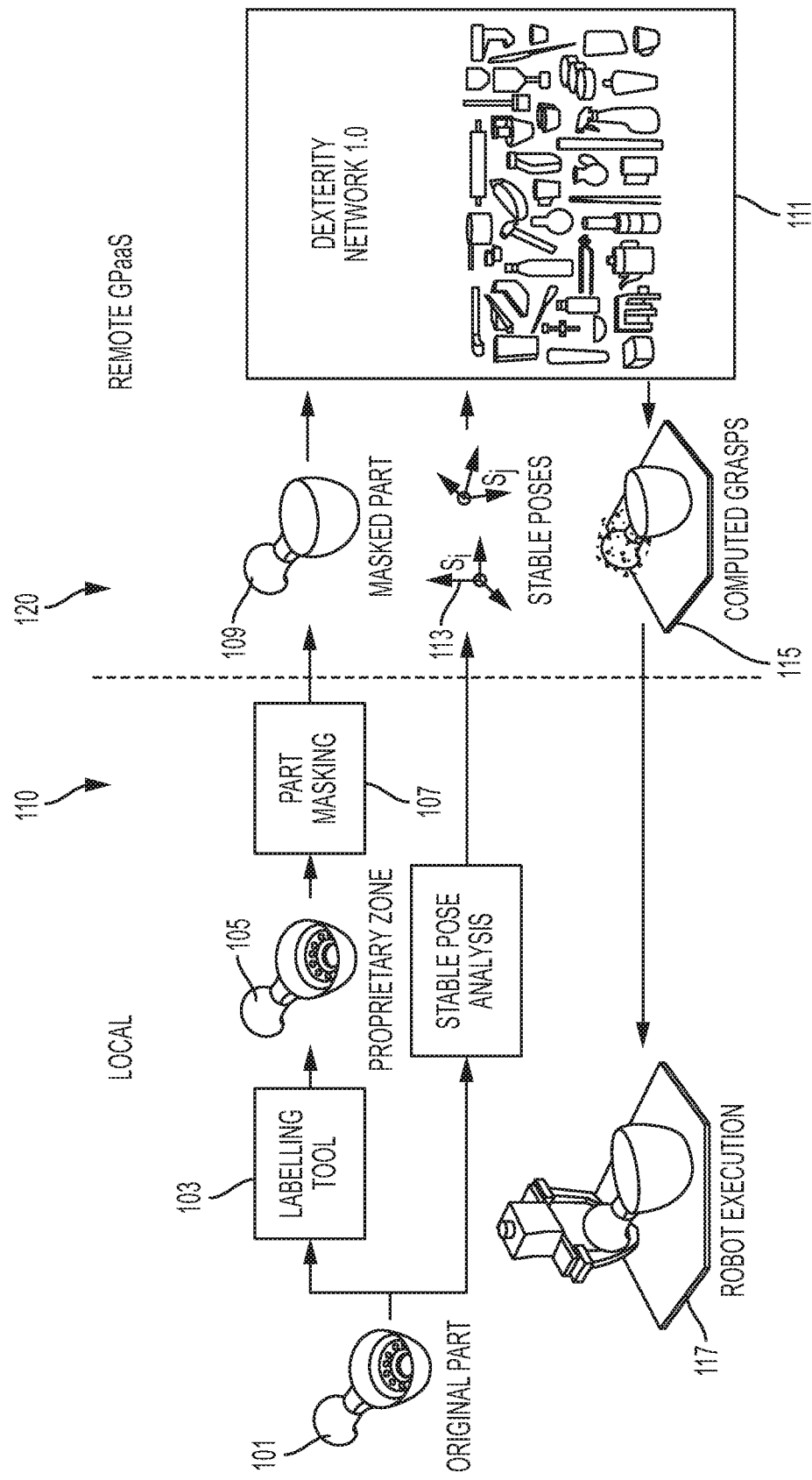
FIG. 1 is an illustration of a GPaaS system according to aspects of embodiments of this disclosure.

FIG. 1 is a block diagram showing the process of preserving privacy in a GPaaS according to certain aspects of embodiments of this disclosure. Industrial users may label proprietary zones 103 relating to original part 101 using a graphical interface. Proprietary zones identified on the part 105 are masked 107 to produce masked part 109. The masked part 109 is presented to a Cloud-based grasp planner 111 along with stable poses for the object 113. The grasp planner 111 computes a set of grasps for each stable pose 115 and returns the grasp sets to the user for robot execution 117 or other industrial processes.

Figure 9:
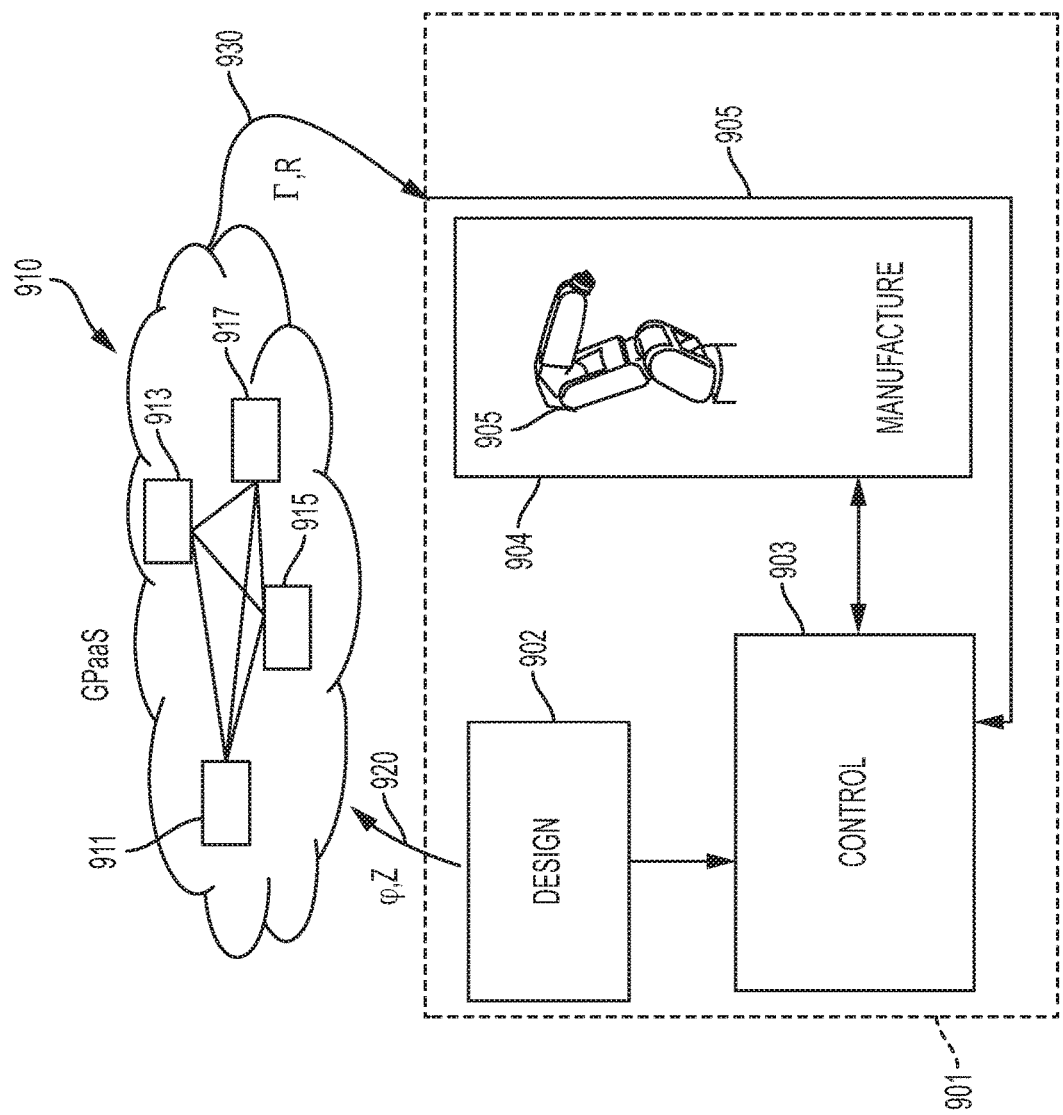
FIG. 9 is a block diagram of a system for preserving privacy in a grasp planning as a service application according to aspects of embodiments of this disclosure.

Referring now to FIG. 9, an illustration of a privacy preserving grasp planning system is shown. A GPaaS system 910 includes a number of processing entities 911, 913, 915 and 917. The processing entities 911, 913, 915, 917 are interconnected to allow data communication between each entity. Some or all processing of grasp planning, including the generation of a list of planned grasps may be performed by any one of the processing entities 911, 913, 915, 917. Alternatively, the processing may be divided and coordinated among any number or combination of the processing entities. 911, 913, 915, 917.

An industrial process 901 includes a first application for design 901, a second control system 903, and a manufacturing process 904, which may include but is not limited to computerized robotic devices 905. Design application 902 may be used to design an object for manufacture or processing. Design application 902 may be configured to create a 3D object mesh comprising a set of vertices representative of geometric features of the object. Triangles may be defined having edges that connect three vertices of the set of vertices. A collection of triangles represent the surface features of the object. The design application 902 may include additional functionality to display the object mesh to a user. The user may orient the view of the object mesh and select portions of the object mesh that are to be considered private or proprietary. The selected portions include one or more of the triangles defining the geometric properties of the object. Design application 902 is further configured to apply a masking function based on the privacy portions. The masking function applies a binary privacy label to each triangle of the object mesh. The binary privacy label is defined by a first value that is indicative of a private or unshared triangle, and a second value that is indicative of a shareable/non-private triangle. Triangles associated with a binary privacy label indicating a private or unshared portion are masked or hidden to create a masked object mesh. The masked object mesh 920 is provided to the GPaaS 910 for processing of the masked object mesh to produce a set of grasps along with a robustness metric 930.

Industrial process 901 includes a control function 903 that provides control of various components of the industrial process 901. For example, control function 903 is in communication with design application 902 and is adapted to receive design information from the design application 902 including the object mesh containing geometric properties of the object. The control function 903 may use the object mesh information to instruct the manufacturing process 904 on how to manufacture or manipulate the designed object. One example of a control function 903 is a programmable logic controller (PLC). A PLC is a device having a computer processor and a plurality of input and output ports. Input ports are in communication with various components of the industrial process 901. Components may include sensors, such as imaging sensors, temperature sensors, potentiometers, or other devices which provide information relating to a state of some aspect of the industrial process 901. The sensor data is received via the input ports of the PLC. The information in the sensor data may be stored in a memory of the PLC, or may be transmitted directly to the computer processor for processing. The computer processor may perform logic operations on the input data and produce output data that is transmitted to one or more control components of the industrial process 901. Control components may include valves, switches, actuators, servos or other control devices which exert control over manufacturing devices, including but not limited to computerized robotic devices.

Control function 903 may further be in communication with a cloud network of GPaaS 910 and receives the set of planned grasps and robustness metric 930 via a communication path 905. Control function 903 may use the set of planned grasps along with an associated robustness to generate control signals for a computerized robotic device equipped with a gripper. The planned grasps may include operable instructions to the control machinery of robotic device which allow the robotic device to grip the object. By way of non-limiting example, the operable instructions may be formatted as numerical code such as G-code used to control automated machine tools such as those commonly found on robotic devices.

A privacy-coverage versus coverage and robustness of the planned grasps for a set of parts may be considered. Masking methods, including removing the proprietary zone on the mesh, replacing each connected component of the proprietary zone with a bounding box, and replacing each connected component of the proprietary zone with its convex hull may be used. In some embodiments, using only the non-proprietary zone in planning may lead to grasps that are in collision with the true object while using the convex hull provides lower dispersion and lower distortion of the object similarity metric from DEX-NET 1.0 than bounding box masking. Further, experiments suggest that coverage does not increase with increasing privacy or robustness in any of the masking methods.

Figure 4:
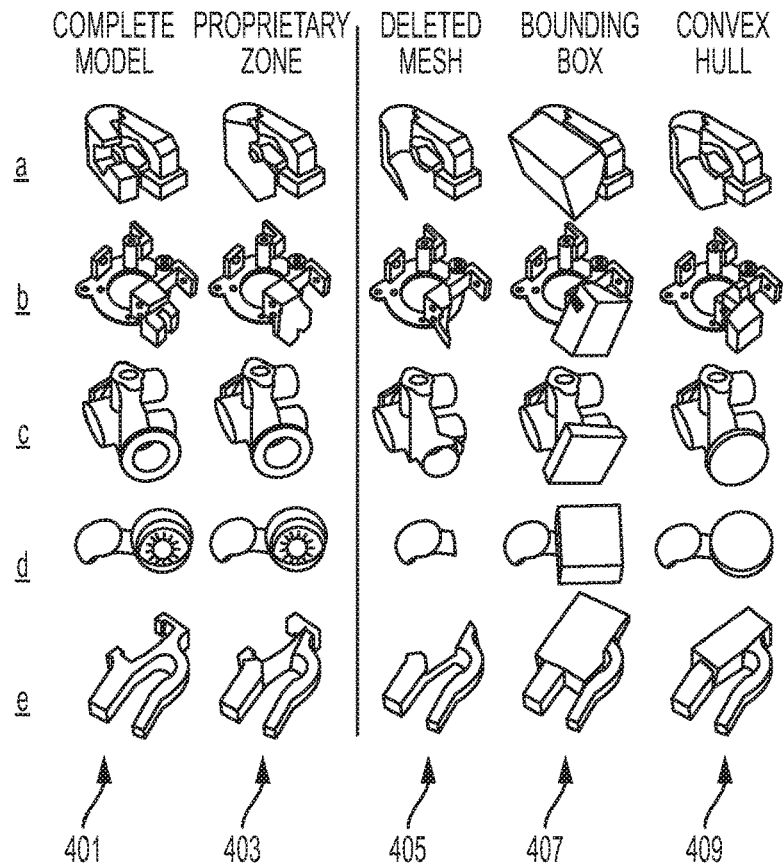
FIG. 4 is an illustration of masking proprietary zones of an object according to aspects of embodiments of this disclosure.

FIG. 4 is a graphical depiction of the different masking methods with respect to five sample parts a-e. Each part a-e is shown as a complete object mesh model in column 401. For each part a-e, column 403 shows a proprietary or private zone of the object model as a shaded area or volume.

In mesh deletion, shown in column 405, the shaded portion of column 403 is completed removed from the object mesh. As the grasp planning application has no information relating to the existence of the proprietary area, it is more likely that grasps generated with the remaining portion of the object mesh will result in grasps that result in collisions when the gripper attempts to position itself for the grasp. Column 407 illustrates a bounding box surrounding the proprietary region. The size of the bounding box, however results in less coverage and some candidate grasps may be eliminated from consideration based on the extent that the bounding box blocks certain contact points on the public portion of the mesh. Column 409 shows the proprietary portion of the object mesh as its convex hull. The convex hull preserves more reachable areas of the part, but may still induce some collisions for grasps that would otherwise be collision free on the original part (i.e., the smaller bounding region of the convex hull, may still occlude access to some portions of the object mesh that are actually accessible).

Grasp planning computes a set of grasps for a given object based on a grasp quality metric. But in practice contact points are not known precisely due to imprecision in perception and control. Several methods have been suggested to handle uncertainty in object pose or contact location, but these methods cannot be easily extended to handle multiple sources of uncertainty. Robust grasp planning handles uncertainty in multiple quantities by finding a set of grasps that maximize an expected quality metric under a set of sampled perturbations in quantities such as object shape, object pose and robot control or friction.

Robust grasp planning is computationally demanding. Recent research has studied precomputing a set of grasps for an object offline, and storing robust grasps in a database. Weisz and Allen, "Pose error robust grasping from contact wrench space metrics", *Proc. IEEE Int. Conf. Robotics and Automation (ICRA), IEEE* 2012, computed the probability of force closure $P_F$ under object pose uncertainty for a subset of grasps in the Columbia grasp database and showed that $P_F$ was better correlated with physical grasp success than deterministic metrics. Brook, et al., "Collaborative grasp planning with multiple object representations," *Proc. IEEE Int. Conf. Robotics and Automation (ICRA), IEEE,* 2011, developed a model to predict physical grasp success based on a set of robust grasps planned on a database of 892 point clouds. Other recent research has used databases of 3D models, images, or point clouds, to estimate the probability of grasp success from simulation or physical trials. Kehoe, et al., "Cloud-based robot grasping with the Google object recognition engine," *Proc. IEEE Int. Conf. Robotics and Automation (ICRA), IEEE,* 2013, pp. 4263-4270, transferred grasps evaluated by $P_F$ on 100 objects in a Cloud-hosted database to a physical robot by retrieving the object with the GOOGLE object recognition engine. Recently, Mahler, et al., "Dex-Net 1.0: A cloud-based network of 3D objects for robust grasp planning using a multi-armed bandit model with correlated rewards," *Proc. IEEE Int. Conf. Robotics and Automation (ICRA), IEEE,* 2016, incorporated herein by reference, created the Dexterity-Network (DEX-NET 1.0), a dataset of over 10,000 objects and 2.5 million grasps, each labelled with $P_F$ under uncertainty in object pose, gripper positioning, and friction, and used the dataset to speed up grasp planning. In embodiments of this disclosure, DEX-NET is extended with an algorithm that plans a covering set of grasps to ensure reachability under different accessibility conditions subject to preserving proprietary part geometry.

A cloud-based grasp planner raises the issue of how to store and transmit data without compromising proprietary geometric information. This consideration provides an example of "privacy over structured data", a topic in database research in which deterministic cryptographic techniques are used to preserve privacy for widely-used data analytics. In robotics and automation systems, security is a topic of interest for the smart grid and manufacturing pipelines, and has also been studied in the context of hackers gaining access to unmanned aerial vehicles (UAVs) and ground vehicles. Methods described herein expand on past work on security of 3D models. Early research considered watermarking schemes that embed information such as the model owner directly into the geometry to identify theft, for example, by using the spectral domain of the mesh. Koller, et al., Protected interactive 3D graphics via remote rendering," *ACM Transactions on Graphics (TOG),* Vol 23, no. 3, ACM, 2004, developed a rendering system that allows users to view low-resolution copies of the entire model and request high-resolution snippets from a protected server to prevent acquisition of the entire model geometry. In industry, models are often protected using industrial computer aided design (CAD) software, which is usually bundled with tools for removing details from a model. SOLIDWORKS and AUTODESK INVENTOR both contain tools for "disfeaturing" a mesh by filling holes, smoothing details, and removing internal features Other techniques include low-pass filtering, finite element re-meshing, and feature suppression.

According to an embodiment, the notion of grasp coverage is also closely related to past research in motion planning and grasping. In motion planning, Lavelle, et al., "On the relationship between classical grid search and probabilistic roadmaps," *The International Journal of Robotics Research (IJRR),* Vol. 34, no 405, pp. 705-724, 2015, introduce the notion of dispersion to construct deterministic sampling strategies for probabilistic roadmap planners that better cover the configuration space. This research has been extended to adaptive sampling strategies that reduce dispersion and to deterministic sampling strategies for SO(3) by Yershova, et al., Deterministic sampling methods for spheres and SO(3)," *Proc. IEEE Int. Conf. Robotics and Automation (ICRA),* Vol. 4, pp. 3974-3980, IEEE, 2004. In grasping, coverage research has focused on sampling dense grasp and motion sets for finding grasps in cluttered scenes, adaptive sampling of robust grasps over an object surface, or analyzing the space of all possible grasps on polygonal objects. However, formal methods for measuring the coverage of grasp sets are relatively less studied. According to embodiments discussed herein, formal notions of grasp coverage based on dispersion between a set of planned grasps and all possible grasps on the object are introduced.

In this disclosure, the precomputation of a set of robust parallel jaw grasps for a 3D object model using a masked version that obscures proprietary geometric information is considered. One goal is to plan a set of grasps, Γ, on the masked object such that the computed grasp set is robust and covers the available surface of the original object.

It will be assumed that a binary quality metric S(g) maps grasps to {0,1}. Based on that assumption, grasp quality may be measured by robustness, or the probability of success $Ps(g)=E[S(g)]$ under uncertainty due to imprecision in sensing and control. As described herein, the probability of force closure $P_F$ under uncertainty in object pose, gripper pose, and friction coefficient as the quality metric, soft finger point contacts, and a Coulomb friction model may be used. It is assumed that the exact shape of the object is given as a compact surface in units of meters with a given center of mass, $z \in R^3$.

Figure 2:
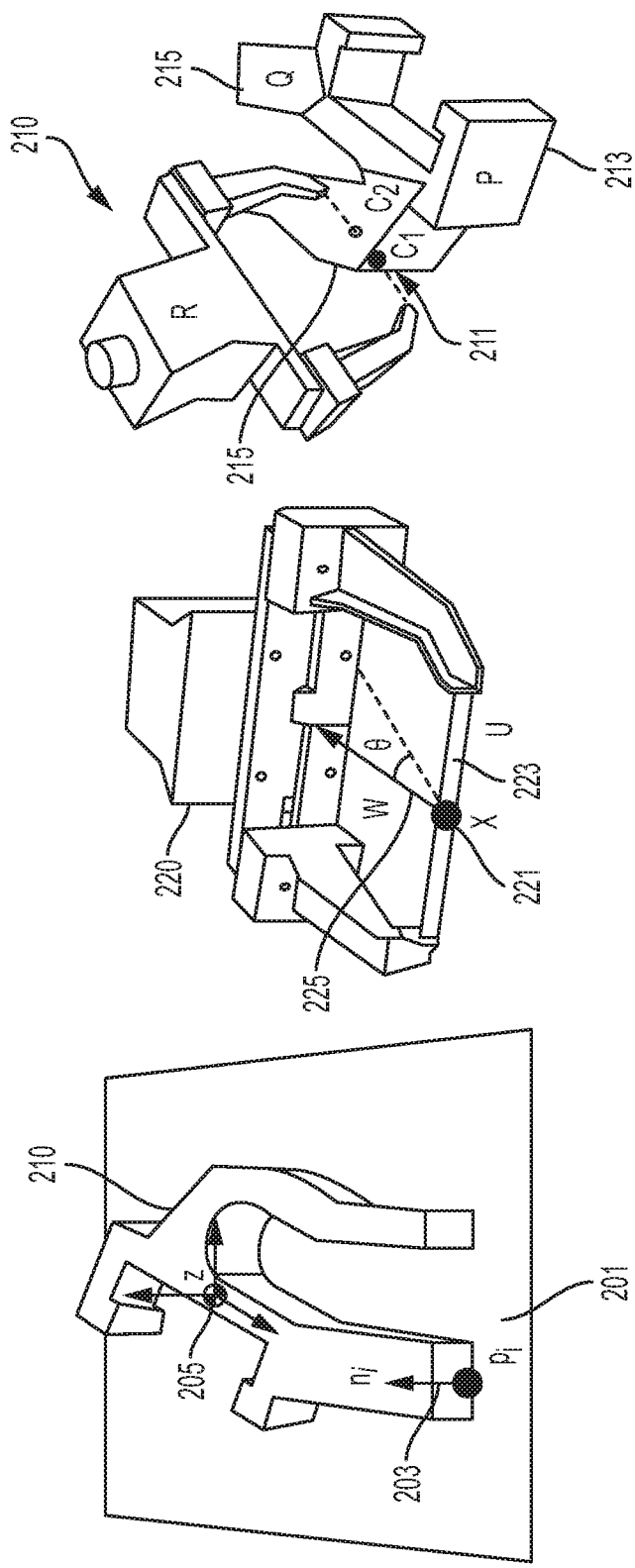
FIG. 2 is an illustration of nomenclature for an object and a robotic gripper according to aspects of embodiments of this disclosure.

FIG. 2 is an illustration of notation used in described in privacy-preserving grasp planning including in this description. An object 210 has a frame of reference based on the object's 210 center of mass z 205. Each object 210 is associated with a set of stable poses on a stable work surface 201 defined by the plane $(n_i, p_i)$ 203. Jaw grasps for gripper 220 may be parameterized based by their center x 221 and axis u 223. Parameters define a gripper pose when an angle θ of the gripper approach axis w 225 is specified. The parallel gripper $\mathcal{R}$ 210 contacts the object mesh at contact points $c_1$ and $c_2$ 211. The space of all possible grasps includes the space of all contact pairs 211. Each mesh may be divided into a private/masked portion P 213 and public shared portion Q 215.

Each object is parameterized as a mesh, $M \subset R^3$. A mesh M is represented as the tuple (V,T), where V is a set of vertices and T is a set of triangles interpolating 2-dimensional surfaces between the vertices. Each vertex $v \in V$ is specified as a point in 3D space and each triangle $t \in T$ is specified as a triplet of vertex indices. All vertices of M are specified with respect to a reference frame centered at the object center of mass z and oriented along the principal axes of the vertex set.

The object may be modeled as resting on an infinite planar work surface under quasi-static conditions with a uniform prior distribution on part orientation. Under this assumption, the object rests in a stable pose, or orientation such that the object remains in static equilibrium on the work surface. A triangular mesh has a finite set of stable poses $S=\{S_1, \ldots, S_U\}$ modulo rotations about an axis perpendicular to the work surface, and each stable pose $S_i$ is parameterized by the table normal $n_i$ and a point on the object touching the table surface.

Object Privacy

To protect privacy, let each object M=(V,T) be equipped with a privacy mask, or function $Z:T \rightarrow \{0,1\}$ such that a triangle $t \in T$ must remain private if Z(t)=1. The private region of the object is denoted $P(M,Z)=t \in T|Z(t)=1$ and $Q(M,Z)=M \backslash P(M,Z)$ the public region. A masked version of the object is created $\varphi_Z(M)$ using a masking function $\varphi_Z: R^3 \rightarrow R^3$ such that $\varphi_Z(x) \neq x \forall x \text{in} P$ and $\varphi_Z(x)=x \forall x \in Q$. The degree of privacy for the mesh is measured by γ, the ratio of the surface area of P to the total surface area.

$$\gamma(M,Z)=\text{Area}(P(M,Z))/\text{Area}(M) \quad \text{Equation (1)}$$

Grasp Parameterization

An exemplary grasp parameterization is illustrated as 210 in FIG. 2. Given an object M, let $G(M)=M \times M$ be the space of all possible contact point pairs on the object, and let $g=(c_1,c_s) \in G$ be a parallel-jaw grasp. A grasp g may alternately be described by the midpoint of the jaws in 3D space x in $R^3$ and approach axis $u \in S^2$ where $$x = \frac{1}{2}(c_1 + c_2) \text{ and } u = \frac{c_2 - c_1}{\|c_2 - c_1\|_2} \quad \text{Equation (2)}$$

A grasp g may also be converted to a gripper pose $T(g,\theta)$ in SE(3) relative to the object by specifying an angle $\theta$ of the gripper approach axis W.

Let R denote a mesh model of a robot gripper and $R(g, \theta)$ denote the gripper model in pose $T(g, \theta)$. Of particular interest are the following subsets of graphs:

Reachable Grasp Set: $X(R,S_i)$: The reachable grasp set is the set of grasps on M such that $R(g, \theta)$ does not collide with the object M or the work surface for stable pose $S_i$.

Robust Grasp Set, Y(T): The set of grasps on M with Ps greater than some threshold T.

Executable Grasp Set, $E(R,S_i,T)$: The intersection of the reachable and robust grasp sets: E=X intersection Y.

Grasp Coverage

Consider an arbitrary grasp set $\gamma \subseteq G$ on object M and a discrete set of planned grasps $\Gamma \subset \gamma$. The extent to which $\Gamma$ covers $\gamma$ using dispersion, a measure of coverage previously used to analyze sampling-based motion planners will be explored.

To measure coverage, first a notion of grasp distance is needed. Grasp will be considered as measuring the distance between grasps for object M by a function $\rho: G \times G \to R$, where:

$$\rho(g_i,g_j)=\lambda(M)\|x_i-x_j\|_2+(2/\pi)\arccos(|\langle u_i,u_j \rangle|) \quad \text{Equation (3)}$$

where $\lambda(M)$ is a constant controlling the relative weighting of the distance between the grasp center and axis.

As described herein, $(M)^{-1}=\max_{x_i,x_j \in \Gamma}\|x_i-x_j\|_2$ is considered to put equal weighting between the center and axis distances.

Figure 3:
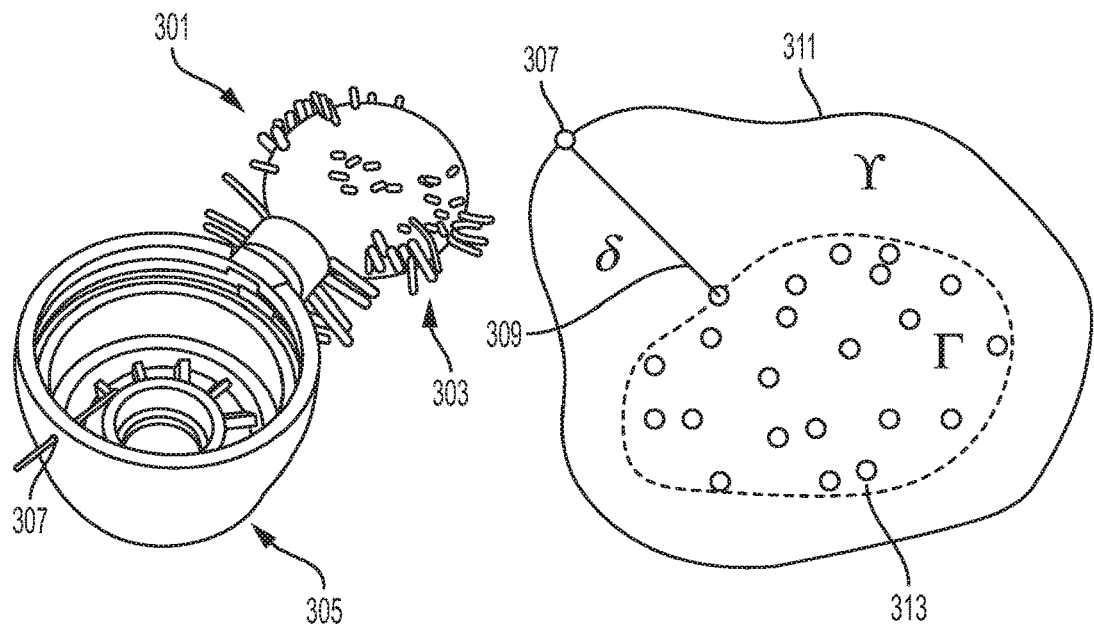
FIG. 3 is an illustration of grasp coverage according to certain aspects of embodiments of this disclosure.

Dispersion, as illustrated in FIG. 3, is formally defined:

$$\delta(\Gamma,\gamma)=\sup_{g_j \in \gamma}\min_{g_i \in \Gamma}\rho(g_i,g_j) \quad \text{Equation (4)}$$

FIG. 3 illustrates a grasp dispersion network δ 309 according to aspects of embodiments of the disclosure. In the work space, the public portion of the object 301 is covered by a set of grasps Γ 313 denoted by the rods 303 extending from the surface of the public portion 301. Each grasp may be illustrated with a line segment having orientation u centered at x (FIG. 2). Each grasp is a sample from a larger space of possible grasps γ 311, such that the set includes all possible grasps on the part. The farthest grasp in γ 311 from the grasps in Γ 313 is denoted 307. Coverage is measured by the dispersion δ, or the radius of the largest empty ball centered in γ 311. Lower dispersion indicates higher grasp coverage.

In the case of $\Gamma=\emptyset$, let $\delta(\Gamma,\gamma)=\infty$. Intuitively, δ measures the radius of the largest ball (under ρ) in γ that does not strictly contain any samples in Γ. A coverage metric is definable as an inverse of dispersion.

Definition: the coverage for Γ with respect to γ is $\alpha(\Gamma,\gamma)=\exp(-\delta(\Gamma,\gamma))$. Coverage approaches 1 as dispersion decreases toward zero and coverage approaches zero as the dispersion becomes infinite.

Objective

The formal objective is to plan a set of n grasps $\Gamma=\{g_1 \ldots g_n\}$ on the masked object such that $\Gamma \subset \varepsilon(R,S_i,\tau)$ and the coverage of $\alpha(\Gamma,\varepsilon)$ is as small as possible. Note that Γ must be a subset of the grasp sets on the original object, even though it is planned using the masked version.

Privacy-Preserving Grasp Planning Algorithm

A first algorithm according to aspects of embodiments of this disclosure provides privacy-preserving grasp planning, as illustrated in FIG. 1. The algorithm takes as input the object mesh M, a masking function φ, and parameters for the executable grasp set, and returns a set of grasps $\Gamma_i$ and robustness metrics $R_i$ for each stable pose $S_i$ of the object. With user inputs, the system masks the object and computes stable poses before transmission, then computes a set of candidate public grasps by considering all possible pairs of contacts at mesh triangle centers, and then prunes grasps based on collisions and robustness to form a subset of the grasp set for each stable pose. The robustness $P_S$ of each grasp may be measured using the probability of force closure $P_F$ under object pose, gripper pose, and friction uncertainty, and compute $P_F$ using Monte Carlo integration.

---

Input: Object Mesh M, Masking Function φ, Robot Gripper R,
Quality Threshold τ, Stable Pose Threshold p, Number of Grasps n, Edge Length
Threshold ε, Robustness Metric $P_S$
Result: Grasp Set Γ and Robustness Metrics R
// Mask mesh and analyze stable poses p
S = StablePoses(M,p);
Z = UserLabel(M);
φz(M) = Mask(M,Z,φ);
// Generate grasp candidates
φz(M) = Subdivide(φZ(M),ε);
C = Γ = R = ∅;
for t ∈ φZ(T) do
  if Z(t) = 0 then
    C = C ∪ {Center(t)};
  end
end
// Compute cover for each stable pose
for $S_i$ ∈ S do
  $\Gamma_i$ = ∅, $R_i$ = ∅, j = 0;
  $G_i$ = Shuffle(C × C);
  while $|\Gamma_i|$ < n and j < $|G_i|$ do
    g = G[j];
    if g ∉ $\Gamma_i$ and $P_S(g)$ > τ and NoCollision(g,$S_i$,R,φz(M)) then
      $\Gamma_i$ = $\Gamma_i$ ∪ {g}, $R_i$ = $R_i$ ∪ {$P_S(g)$};
    end
    j = j + 1;
  end
  Γ = Γ ∪ {$\Gamma_i$}, R = R ∪ {$R_i$};
end
return Γ,R

---

Grasp Candidate Generation

A set of candidate grasps may be formed for each object by forming a set of candidate contact points from the mesh triangle centers and then evaluating and pruning pairs of possible contacts. In order to ensure that the set of contacts covers the mesh surface, triangles of the masked mesh may be subdivided using primal triangular quadrisection until the maximum edge length of each triangle is less than some threshold ε, transferring the privacy label $Z(t_i)$ from each triangle to its children. Then the set of triangle centers on the public zone of the subdivided mesh may be used as the set of candidate contacts C since the geometry of triangles in the proprietary zone may have been altered. The triangle subdivision step increases the density of the candidate grasp set.

Privacy-Coverage Tradeoff

The set of possible contacts decreases as the surface of the part becomes more private, which intuitively would lead to a smaller grasp set and therefore smaller coverage. This property holds formally for the Privacy-Preserving Grasp Planning Algorithm according to embodiments described in this disclosure. Consider a part with two masks $Z_1$ and $Z_2$ such that proprietary zones are nested, $P(M,Z_1) \subset P(M,Z_2)$. Then the candidate grasp sets $G_1$ and $G_2$ are also nested, $G_2 \subset G_1$. If $n > |G_i|$ then the associated loop terminates only once all possible contact pairs have been evaluated, and thus the planned grasp sets are also nested $\Gamma_2 \subseteq \Gamma_1$. Therefore, $\alpha(\Gamma_1, \varepsilon) \geq \alpha(\Gamma_2, \varepsilon)$.

Figure 5:
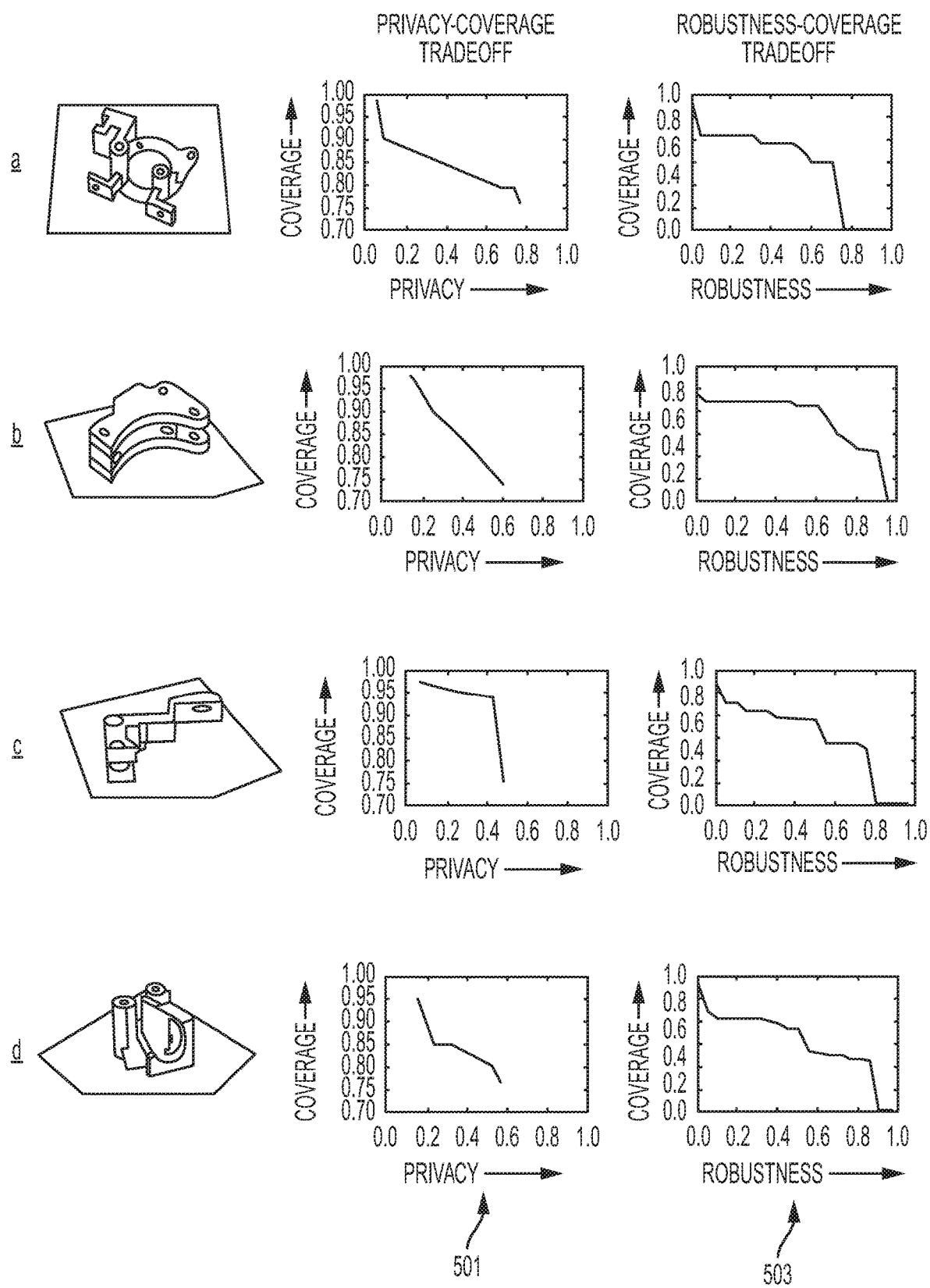
FIG. 5 is a graphical depiction of a privacy-coverage and robustness-coverage tradeoff according to aspects of embodiments of this disclosure.

FIG. 5 is a graphical depiction showing the tradeoffs between privacy and coverage (column 501) and between privacy and robustness (column 503) for a group of four parts a-d. By way of example, part a may be a gearbox, part b may be an extruder, part c may be a nozzle mount, and part d may be an idler mount. For each part a-d as privacy increases, coverage decreases. Likewise as robustness increases, coverage will decrease. The functions are non-linear due to the fact that the set of robust grasps may be denser in particular regions of the mesh, and jumps in the trend may occur when areas of high density grasps are masked.

Part Masking

Before transmitting the part across a network for grasp planning, the part must be masked to ensure that proprietary geometry is not compromised. One proposed method, illustrated in the left portion of FIG. 1 (110), consists of a labelling tool for industrial users to select proprietary zones via a graphical user interface and a mask application stage before transmission.

Labelling Tool

To use the graphical tool for labelling the proprietary zones of parts, a user first loads a mesh and orients the mesh such that the proprietary zone of the mesh lies within a bounding box in a graphical user interface. Then the user drags a mouse or operates an input device to form a box in pixel coordinates, and any triangles that project within the bounding box are labelled private. The labelled region of the part is then colored (e.g. the region may be colored blue) for the user to either or accept or reject the label. If the label is accepted, then a binary label for each triangle $Z(t_i)$ is saved such that $Z(t_i)=1$ if triangle $t_i$ is private and $Z(t_i)=0$ is not.

Figure 8:
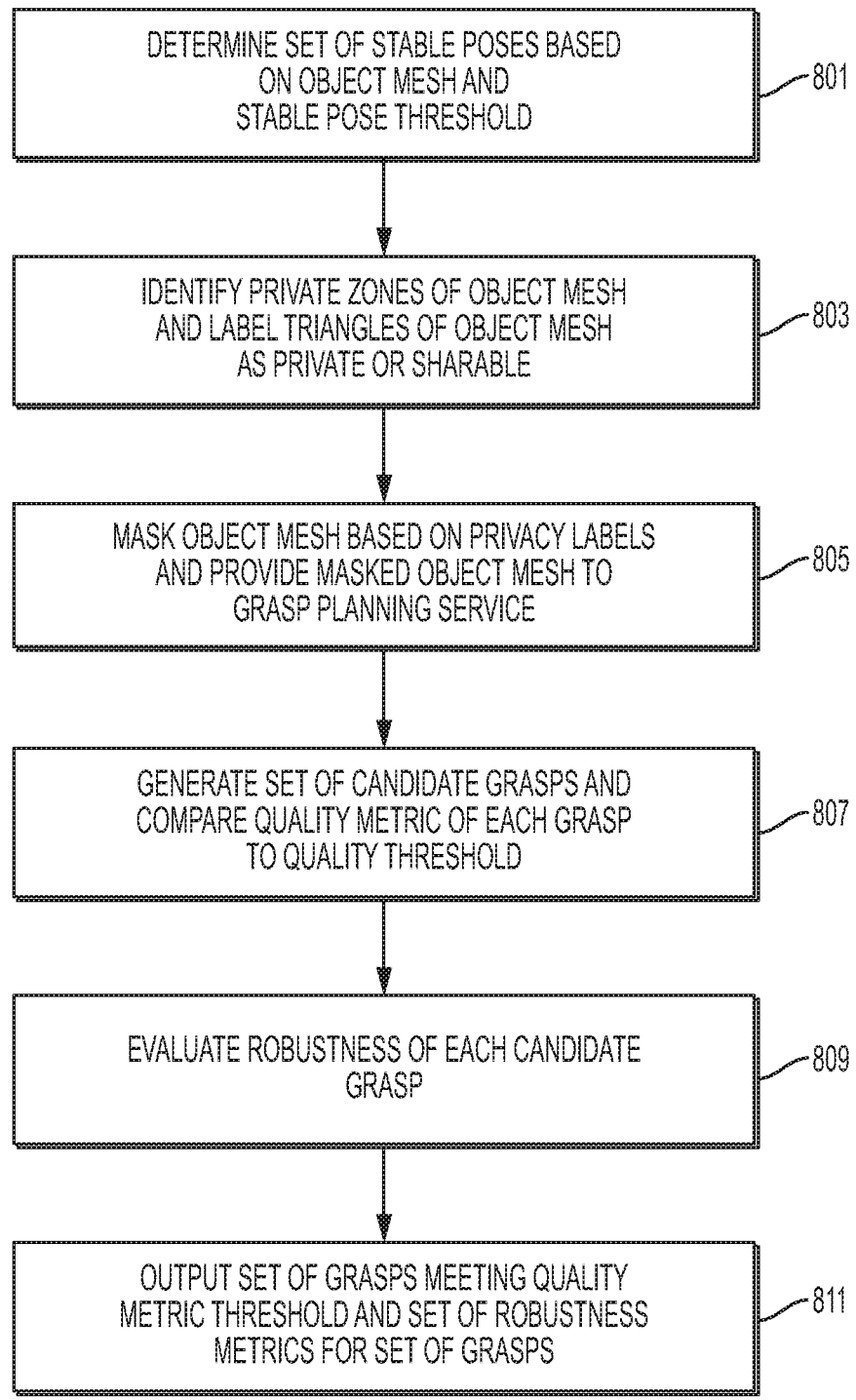
FIG. 8 is a process flow diagram of a process of preserving privacy in a grasp planning as a service application according to aspects of embodiments of this disclosure.

FIG. 8 is a process flow diagram for a privacy-preserving grasp planning algorithm according to aspects of embodiments of this disclosure. For an object to be processed in a manufacturing process, a 3D mesh representation of the object is generated in a design application, for example, a computer aided design application. For a three dimensional object, one or more stable poses may exist, which define positions (or poses) of the object relative to a planar work surface on which the object rests, such that the object rests in a state of equilibrium when in that pose. The design application determines a set of stable poses based on the object mesh and a stability threshold 801. The stability threshold that characterizes the stability of the pose under consideration. When a given pose possesses a stability metric that exceeds the stability threshold, that pose is considered to be a stable pose. During industrial processing, the set of stable poses define positions in which the object may be found during processing. These poses may be detectable by sensors associated with the industrial process, such as image sensors, proximity sensors or other sensors. A detected pose identifies the present position of the object so that further processing may determine how the industrial process may interact with the object. For example, a detected pose may be used to instruct a robotic device how to approach and grip the object. In addition to gripping, other industrial processes may be performed on the object base on its present pose or position. For example, grinding, drilling, joining, fixturing, machining, inspection, assembly and other functions may be performed on an object during industrial processing. The algorithm of FIG. 8 may be adjusted for other processes, such that the output of the algorithm may include in addition to or in place of planned grasps, machining parameters, including angles of approach and depths, feature identification and inspection, application of materials, such as adhesives or fasteners, or other information relating to industrial processes.

Once the stable poses of the object are identified, the design application may be configured to allow a user to view the 3D object mesh and to indicate to the design application, areas or zones of the 3D object mesh that represent private or proprietary areas of the object. Private or proprietary areas of the object may include features, properties or other indicia of the object which the user wishes to remain private. When using a distributed network service, such as a GPaaS, the private zones or areas of the object contain geometric properties of the object that the user does not wish to share with the GPaaS application since these applications may use the information in processing grasp planning for other users. This may lead to disclosure of information or properties of the object that result in the loss of a competitive advantage. The design application therefore allows the user to indicate the areas of the object mesh, including vertices and triangles defined by the vertices, which are to be considered private. The application is further configured to produce a binary privacy label which labels triangles of the object mesh as being private or shareable 803.

When the private zones of the object mesh have been selected, a mask function is used to identify the portions of the object mesh that are proprietary and obscure or eliminate these portions of the mesh. The masked object mesh is then provided to a shared processing system, for example a GPaaS system 805.

The shared system receives the masked object mesh and uses the public or shared portions of the object mesh to identify a set of candidate grasps. Each candidate grasp is evaluated with respect to a quality threshold 807. In addition, each grasp is evaluated according to a robustness metric representative of a likelihood that the planned grasp will result in a successful grasp of the object 809. A set of planned grasps is created with the grasps associated with a quality metric that exceeds the quality threshold and possess a robustness measure that exceeds a predetermined level. In some embodiments, the robustness metric may be determined according to Ferrari and J. Canny. "Planning optimal grasps," *Proceedings of the IEEE International Conference on Robotics and Automation (ICRA)*, pp. 2290-2295. IEEE, 1992. The set of planned grasps are output from the shared system and provided to an industrial process 811. The planned grasps may then be used by a control system associated with the industrial process. For example, a planned grasp for a particular object may include an angle of approach for a robotic gripper, and a location for contact points located on the surface of the object where the gripper's jaws contact the object.

In some embodiments, the shared system may determine that some grasps in the set of planned grasps are associated with relatively low robustness metrics. In such a case, analysis may determine that reduction of the masked portions of the object mesh may result in a larger and better set of planned grasps. In such cases, the grasp planning application in the shared system may provide feedback information to the design application. The design application may inform a user that reduction of the selected private or masked region of the object mesh may result in a larger or more robust set of planned grasps. The user may then determine the impact of the coverage versus privacy tradeoff and make a determination as to whether the masked zone may be altered to allow additional grasps to be analyzed.

Masking Methods

FIG. 4 illustrates the three methods considered herein for obscuring the geometry of a part with a mask. Each method produces a masked part $\varphi Z(M)=(\varphi Z(V),\varphi Z(T))$ from the original part $M(V,T)$. The methods were chosen to completely obscure the private region, motivated by techniques from prior research on 3D model privacy.

Deleted Mesh

The masked triangle list $\varphi Z(T)$ contains all triangles from the public zone of the mesh $Z(t_1)=0$ and all triangles from the private zone $Z(t_1)=1$ are deleted. The masked vertex list $\varphi Z(V)$ contains all vertices that are referenced by a triangle in $\varphi Z(T)$. One potential shortcoming of this method is that some areas on the masked object may appear reachable by a gripper but cannot be reached on the true object due to collisions.

Bounding Box

The masked part $\varphi Z(TM)$ contains all triangles and vertices from the public zone of the mesh. Triangles and vertices from the private zone are broken into connected components. Each connected component is replaced by a cube oriented along the rotational axes of the reference frame for the original part. The bounding boxes are zippered to the original mesh. This method preserves the reachable areas of the part, but the size of the bounding boxes can prune grasps that are reachable on the original part.

Convex Hull

The masked part $\varphi Z(TM)$ contains all triangles and vertices from the public zone of the mesh. Triangles and vertices from the private zone are broken into connected components, each of which is replaced by its convex hull. The convex hulls are zippered to the original mesh. This method preserves the reachable areas of the part but may also induce collisions for grasps that are collision-free on the original part.

Algorithms for privacy-preserving grasp planning according to some aspects of embodiments herein may be described in terms of DEX-NET 1.0, and planned grasp sets $\Gamma \subset \varepsilon$ for a set of 23 parts from THINGAVERSE. Unless otherwise noted, experiments used a number of grasps $n=10,000$, a $P_F$ threshold of $T=0.01$, and an edge length threshold of 2.0 cm. The system computes the stable poses for each object and use the stable pose with highest probability of occurrence under a uniform distribution on part orientation. A mesh model of a ZYMARK parallel-jaw gripper with custom fingers may be used as the gripper R and collision checking may be performed using OPEN-RAVE. For computing grasps poses $\theta$ is set such that the approach axis w is maximally aligned with the table normal given the stable pose. Evaluation of $P_F$ was performed with 25 random samples using the Monte Carlo integration method. The average computation time to mask the object for the deleted mesh, bounding box, and convex hull were 0.72 s, 1.22 s, and 1.29 s, respectively.

Label Selection

User defined labels may be used to mask features (e.g. holes, air flows, or connectors) of each part to reflect the coverage metrics and tradeoffs that might be observed in practice, since proprietary features are often masked by hand in industry. A single human user without prior knowledge of the details of a Privacy-Preserving Grasp Planning algorithm used the masking tool to label each of the 23 parts with a single proprietary zone and also labelled four of the parts with a set of five disjoint masks to study the privacy-coverage tradeoff. The user was instructed to label the largest feature on the part surface of each as proprietary for the single masks, and to mask the five largest features in arbitrary order for the nested masks.

Comparison of Masking Methods

Table I compares each of the masking methods in terms of the average coverage metric for the single mask dataset over the stable poses of the 23 parts, the percentage of planned grasps that are in collision on the true object, and the Multi-View Convolutional Neural Network object kernel similarity metric from DEX-NET 1.0. High similarity to the original object indicates that the masked mesh could be used to accelerate grasp planning for new objects with prior data. It may be observed that the method of deleting the proprietary region of the mesh performs well in terms of coverage but leads to planned grasps in collision on the original object, which could be problematic if the grasps were executed without further checks.

| Masking Method | Mean a | % Collision | Similarity |
| --- | --- | --- | --- |
| Mesh Deletion | 0.79 | 6.9 | 1.05 |
| Bounding Box | 0.70 | 0.0 | 2.60 |
| Convex Hull | 0.74 | 0.0 | 3.22 |

FIG. 5 illustrates some masked parts are never in collision on the original part and provide higher coverage and higher similarity to the original object than the bounding box method, suggesting that speedups with prior data observed in DEX-NET 1.0 would hold.

Privacy-Coverage and Robustness-Coverage Tradeoff

Figure 6:
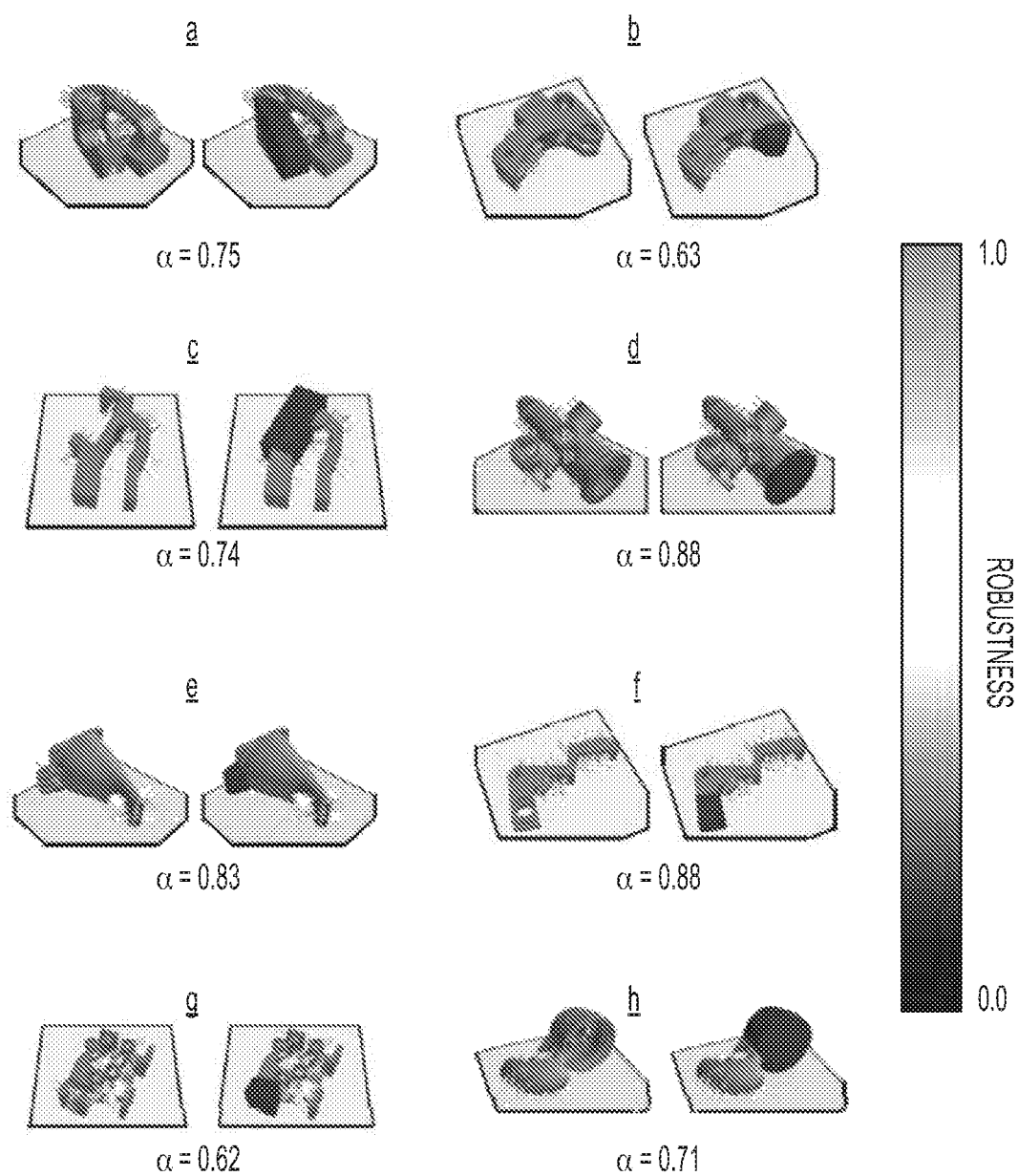
FIG. 6 is a graphical depiction of robustness to coverage according to aspects of embodiments of this disclosure.

FIG. 6 studies the privacy-coverage tradeoff and robustness coverage tradeoff on a set of four parts (e.g., a gearbox, an extruder, a nozzle mount, and an idler mount), each with five disjoint proprietary regions masked using the convex hull method.

For the privacy-coverage tradeoff $\alpha(\Gamma,\varepsilon(R,S_i,\tau))$ was compared for the stable pose with the highest probability and $\tau=0.01$ to the privacy metric $\gamma$. Coverage never increases with increased privacy, consistent with expectations as described above with regard to part masking. However, the rate of change of coverage with respect to privacy does not appear to be consistent across the examples. This may be because grasps do not appear to be uniformly distributed across the part surface, suggesting that removing some parts of the mesh can affect coverage more significantly than others. This effect is illustrated in the covering sets displayed in FIG. 7.

For the robustness-coverage tradeoff, the privacy-preserving grasp planning algorithm was run with a fixed privacy mask and robustness values $\tau\varepsilon[0,1]$ in increments of 0.05. Coverage $\alpha(\Gamma,\varepsilon(R,S_i,0))$ for the stable poses with highest probability is compared to the robustness $\tau$ for $\Gamma$ planned by the algorithm. It may be seen that the coverage always decreases with an increasing robustness threshold, consistent with the intuition that the set of possible grasps considered by the algorithm can only decrease with increasing $\tau$.

Covering Grasp Sets

FIG. 6 compares the top 50 most robust grasps from the covering grasp sets for the original masked part versus the grasp set computed by the algorithm using convex hull masking for a set of eight example parts a-h. It may be seen that for several parts, such as the fan shroud h and turbine housing e, the set of most robust grasps is clustered in particular regions of the part geometry and when this zone is not masked, the coverage remains high. The covering grasp sets on the original part geometry exhibit variations in density, which may explain the part-variation in the privacy-coverage tradeoffs discussed with reference to FIG. 5. Algorithms according to embodiments of privacy-preserving grasp planning correctly avoid the proprietary region of the part and prunes grasps in collision near the table and areas of complex part geometry.

Computation Times

Figure 7:
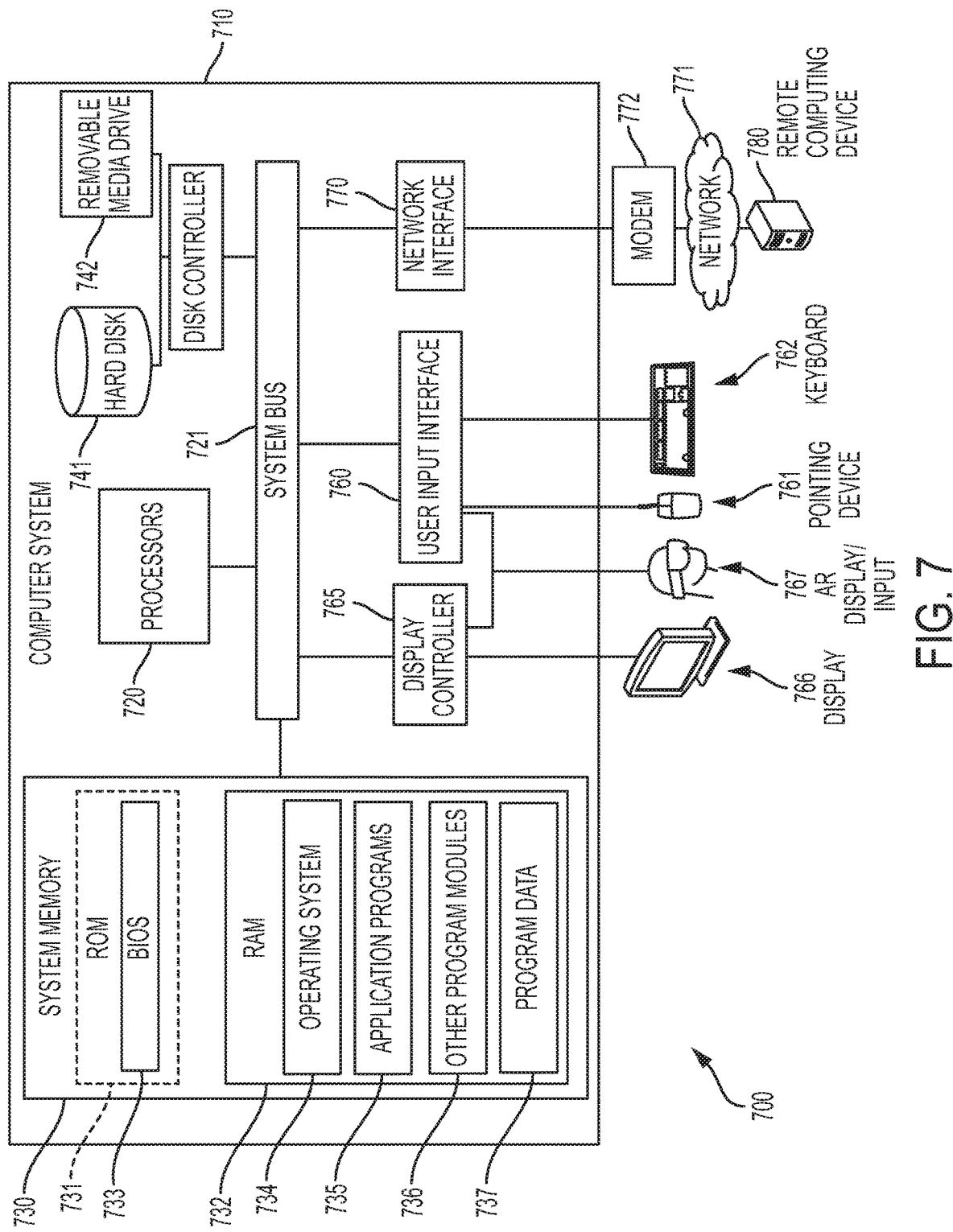
FIG. 7 is a block diagram of a computer system in which aspects according to embodiments of this disclosure may be implemented.

The runtimes in seconds for the Privacy-Preserving Grasp Planning algorithm on the eight parts shown in FIG. 7 were (left to right, top to bottom): 40.0, 36.5, 38.6, 39.1, 41.2, 42.0, 39.6, and 48.9. On average planning took 0.25 seconds per grasp, consistent with expected results. All planning was performed on an Intel Core i7-4770K 3.5 GHz processor with 6 cores.

Discussion and Further Work

This disclosure presented an approach to privacy-preserving grasp planning: finding a set robust grasps for parts while preserving proprietary geometric features. The algorithm masks the part using the convex hull of the proprietary region of the part surface, checking collisions and the probability of force closure for each. A grasp coverage metric based on dispersion is introduced. Experiments suggest that the convex hull masking method outperforms mesh deletion and bounding box masking and that coverage decreases with increasing privacy, and the increase is roughly proportional to the density of grasps in the private region of the mesh.

In future work, the privacy-coverage tradeoff with additional parts and work with industrial experts to refine the privacy-labelling interface and perform physical experiments may be considered. Approaches may be considered such as increasing computational efficiency by actively identifying candidate grasp surfaces that lack coverage, for example, using annealing or Multi-Armed Bandits. Alternate methods to preserve privacy may be explored, for example adding small deformations to the geometry. Furthermore, algorithms to iteratively tradeoff privacy with robustness by iteratively exposing different boundary sets may be studied.

FIG. 7 illustrates an exemplary computing environment 700 within which embodiments of the invention may be implemented. Computers and computing environments, such as computer system 710 and computing environment 700, are known to those of skill in the art and thus are described briefly here.

As shown in FIG. 7, the computer system 710 may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication therebetween. A user interface processor or generator is a known element comprising electronic circuitry or software or a combination of both for generating display images or portions thereof. A user interface comprises one or more display images enabling user interaction with a processor or other device.

Continuing with reference to FIG. 7, the computer system 710 also includes a system memory 730 coupled to the system bus 721 for storing information and instructions to be executed by processors 720. The system memory 730 may include computer readable storage media in the form of volatile and/or nonvolatile memory, such as read only memory (ROM) 731 and/or random access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, other program modules 736 and program data 737.

The computer system 710 also includes a disk controller 740 coupled to the system bus 721 to control one or more storage devices for storing information and instructions, such as a magnetic hard disk 741 and a removable media drive 742 (e.g., floppy disk drive, compact disc drive, tape drive, and/or solid state drive). Storage devices may be added to the computer system 710 using an appropriate device interface (e.g., a small computer system interface (SCSI), integrated device electronics (IDE), Universal Serial Bus (USB), or FireWire).

The computer system 710 may also include a display controller 765 coupled to the system bus 721 to control a display or monitor 766, such as a cathode ray tube (CRT) or liquid crystal display (LCD), for displaying information to a computer user. The computer system includes an input interface 760 and one or more input devices, such as a keyboard 762 and a pointing device 761, for interacting with a computer user and providing information to the processors 720. The pointing device 761, for example, may be a mouse, a light pen, a trackball, or a pointing stick for communicating direction information and command selections to the processors 720 and for controlling cursor movement on the display 766. The display 766 may provide a touch screen interface which allows input to supplement or replace the communication of direction information and command selections by the pointing device 761. In some embodiments, an augmented reality device 767 that is wearable by a user may provide input/output functionality allowing a user to interact with both a physical and virtual world. The augmented reality device 767 is in communication with the display controller 765 and the user input interface 760 allowing a user to interact with virtual items generated in the augmented reality device 767 by the display controller 765. The user may also provide gestures that are detected by the augmented reality device 767 and transmitted to the user input interface 760 as input signals.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a magnetic hard disk 741 or a removable media drive 742. The magnetic hard disk 741 may contain one or more data stores and data files used by embodiments of the present invention. Data store contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

The computing environment 700 may further include the computer system 710 operating in a networked environment using logical connections to one or more remote computers, such as remote computing device 780. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A system for analyzing geometric properties of an object for robotic grasp planning, comprising:

a first computer processor configured to design the object and produce information relating to the geometric properties of the object;

a second computer processor in communication with the first computer processor, the second processor configured to receive the information relating to the geometric properties of the object;

wherein a first portion of the information relating to the geometric properties represents a private/masked portion of the object that conceals at least one aspect of the geometric properties of the object, and a second portion of the information relating to the geometric properties of the object represents a sharable/unmasked portion of the object, and the second processor is configured to analyze the unmasked portion of the object and provide output information of the analysis to an industrial system;

a privacy labeling tool configured to run on the first processor, the labeling tool adapted to:
display a 3D mesh representation of the object, the mesh comprising a plurality of vertices and a plurality of triangles defined by the connection of three of the vertices;
receive one or more commands from a user defining hounding boxes that contain at least one of the triangles of the mesh that are identified as masked portions of the object; and
label each triangle of the mesh with a binary privacy label to indicate if the triangle should be private/masked or sharable/unmasked; and a candidate grasp generation tool configured to run on the second processor, the candidate grasp generation tool configured to identify a set of candidate grasps for a robot to grasp the object, each grasp based on two contact points on a surface of the object mesh, wherein each of the two contact points are associated with a center of a corresponding triangle in the sharable/unmasked portion of the object mesh.

2. The system of claim 1, further comprising:
a privacy masking tool configured to run on the first processor, the privacy masking tool configured to apply a masking function, the masking function configured to mask or hide the triangles marked as private based on the binary privacy label of each triangle in the mesh, wherein a triangle having a binary privacy value of 1 is private and a triangle having a binary privacy value of 0 is sharable.

3. The system of claim 2, wherein the first processor computes stable poses of the object and transmits those to the second processor.

4. The system of claim 2, wherein the masking function is configured to create a bounding box around regions of the mesh that contain triangles associated with masked portions of the object mesh.

5. The system of claim 3, wherein the masking function is configured to replace connected components associated with masked portions of the object mesh with a convex hull of each connected component.

6. The system of claim 1, wherein the candidate grasp generation tool is further configured to:
rank the candidate grasps in order of robustness to perturbations.

7. The system of claim 6, wherein the candidate grasp generation tool is further configured to subdivide the at least one triangle in the unmasked portion of the object mesh by primal triangular quadrisection.

8. The system of claim 6, wherein the candidate grasp generation tool is further configured to:
determine for candidate grasps for each stable pose of the object:
whether operation of the robotic gripper associated with each candidate grasp results in a collision of the gripper with a portion of the object; and
if there is no collision for a particular candidate grasp, determine a robustness measure of the candidate grasp indicative of whether operation of the gripper to contact the object at the associated contact points for the associated stable pose of the object will result in successful grasp of the object.

9. The system of claim 8, wherein the robustness measure is based on a probability of force closure under object pose, robotic gripper pose, and friction uncertainty.

10. The system of claim 6, wherein the candidate grasp generation tool is further configured to:
generate information indicative of an improvement of candidate grasp quality, based on a suggested reduction in the size of the private/masked portion of the object.

11. The system of claim 1, wherein the second computer processor is configured to provide output information relating to fixturing of a part in the industrial system.

12. The system of claim 1, wherein the second processor is associated with a grasp planning as a service (GPaaS) online application.

13. A method of analyzing geometric properties of an object for robotic grasp planning, comprising:
in a computer processor, receiving design information relating to a first portion of the received designed information as a private/masked portion of the object and to a second portion of the received design information as a shared/unmasked portion of the object, wherein the private/masked portion of the object conceals at least one aspect of the geometric properties of the object;
in the processor, analyzing the first and second portions of the design information relating to the geometric properties of the object; and
in the processor, producing an output representative of a property corresponding to the geometric properties of the object, based on the unmasked portion of the object;
providing the output representative of the property to an industrial system;
in the processor, receiving a command from a user, the command operative to identify at least one proprietary zone comprising at least one triangle of the object mesh;
creating a binary privacy label for each triangle in the object mesh, wherein the binary privacy label has a first value representative of a private/masked triangle and a second value representative of a sharable/unmasked triangle; and
in the processor, identifying a set of grasps based on three-dimensional mesh for a robotic gripper and sharable/unmasked triangles of the object mesh.

14. The method of claim 13, further comprising:
in the computer processor, representing the geometric properties of the object as a three-dimensional mesh comprising a plurality of vertices and a plurality of triangles representative of surfaces of the object, each triangle defined by three of the plurality of vertices.

15. The method of claim 14, further comprising:
in the computer processor, determining a set of stable poses for the mesh relative an infinite planar work surface.

16. The method of claim 14, further comprising:
in the processor, assigning a quality metric to each grasp in the set of grasps; and
outputting a set of planned grasps, wherein each planned grasp has a quality metric that exceeds a predetermined threshold.

* * * * *